May 10, 1927.
C. M. STARR
1,628,339
AUTOMATIC CUT-OUT
Filed July 11, 1925
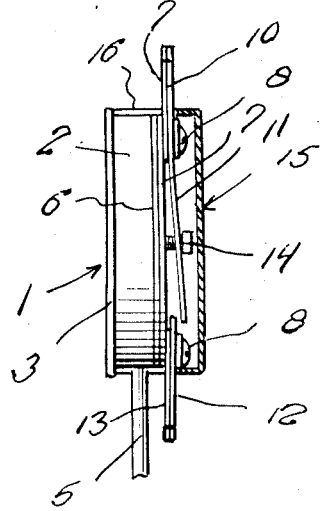
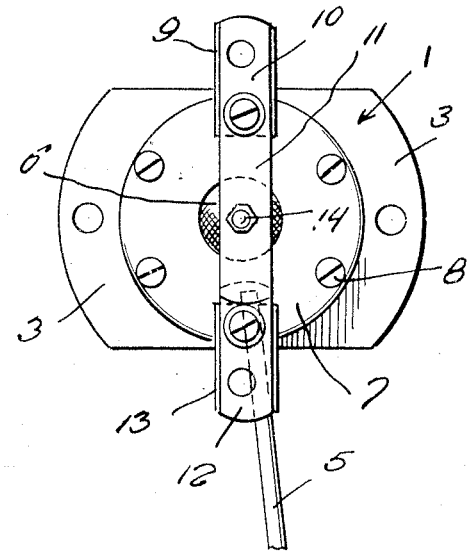
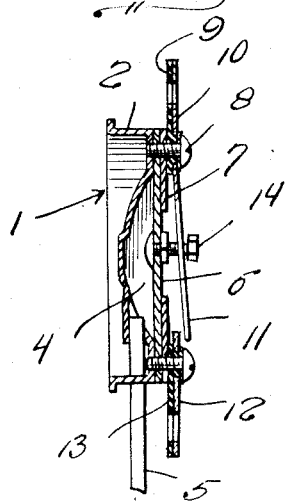
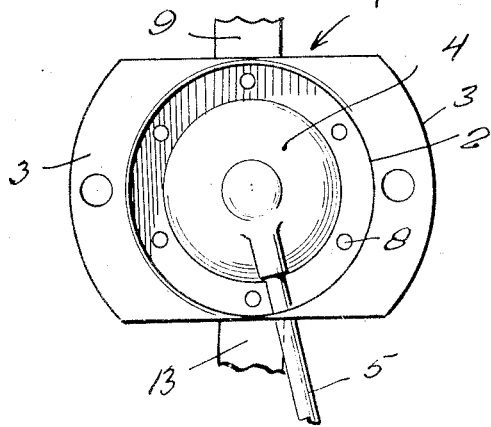
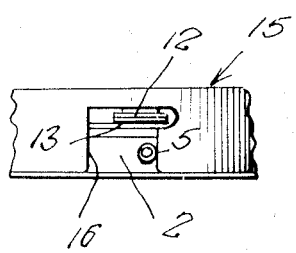
Charles M. Starr,
by Clarence A. O'Brien Patented May 10, 1927.

1,628,339

UNITED STATES PATENT OFFICE.

CHARLES M. STARR, OF SOUTH BEND, INDIANA.

AUTOMATIC CUT-OUT.

Application filed July 11, 1925. Serial No. 42,969.

This invention relates to an improved automotive appliance, which may be readily entitled an automatic electric circuit cut-out.

The invention has more particular reference to a cut-out which is designed to be embodied in and to form a permanent part of an electric ignition circuit or system or the like which is employed in association with internal combustion engines, used more particularly upon automobiles and the like.

It has been observed that automobile operators frequently forget to turn off the ignition control switch, and the result that current continually discharges from the battery through the various outlets of the circuit, and in a comparatively short time, the battery is run down and must be recharged.

In order to prevent this accidental waste of electric current, I have evolved and produced an exceedingly novel and simple and inexpensive contrivance which can be readily embodied in the ignition circuit of an automobile in order to serve to automatically open the circuit the moment that the engine stops. Consequently, if the operator should fail to turn off the main controlling switch on the instrument board, the circuit would, be nevertheless broken and no current allowed to pass therethrough and waste.

The particular construction employed for accomplishing the end sought, constitutes the novelty. This construction will be pointed out in detail, and will then be set forth in the appended claim.

In the accompanying drawing, forming a part of this application, and in which like numerals are employed to designate like parts throughout the same:

Figure 1 is a side view of a device constructed in accordance with the present invention.

Fig. 2 is a front elevation of the same.

Fig. 3 is a central sectional view, with parts in elevation.

Fig. 4 is a view like Fig. 2 looking at the opposite side of the same.

Fig. 5 is a detail view showing the removable cover in place.

Referring to the drawings in detail, it will be seen that the reference character 1 designates generally a metal stamping, embodying a cup 2 having a pair of peripheral attaching flanges 3 at the open sides thereof. The center of this cup is depressed to provide a concavity 4. A relatively small suction conduit 5 is connected with this depression and extends through the rim of the cup and is adapted to be connected to the intake manifold (not shown) of an internal combustion engine in any appropriate manner.

Stretched tautly across the concavity 4 is a flexible diaphragm 6 which is composed of suitable material, this diaphragm being fastened to the cup 2 by an annular retaining ring 7 and appropriate fasteners 8.

Referring to Fig. 3, it will be seen that a relatively short strip of suitable insulating material 9 is fastened between the ring 7 and a metallic contact strip 10. The free end portion of this strip 10, indicated at 11 extends across the center of the device as more plainly shown in Fig. 2 and forms what will be broadly referred to as a relatively movable contact. This movable contact is cooperable with the extended end of a complemental contact strip 12 with which another strip of insulation 13 is cooperable.

Attention is directed to the fact that a single fastener may be employed for holding the contact 12, insulating strip 13 and a part of the ring 7, diaphragm 6 in position upon the stamping 1. This is also true of the contact strip 10, insulating 9 etc. This is believed to be a novel assembly of parts. It is yet to be pointed out that a bolt connector 14 is carried by the central portion of the aforesaid diaphragm 6 and extends through the central opening at the center of the ring 7 and is connected with the central portion of the relatively movable contact 11.

Thus, when the diaphragm is acted on, it exerts a pull upon this contact strip and moves it into electrical engagement with the relatively stationary contact 12.

Attention is also called to a removable cover 15 which I employ. This is provided at diametrically opposite points with bayonet slots 16. Obviously, these bayonet slots are engageable with the extensions provided by the insulation members and contacts and serve to hold the cover in operative position by simply rotating the same. In connection with the fiber insulation strip, it will be noted that they are a little bit wider than the contact strips, so that when the cover is placed over the contacts, short circuiting will be prevented.

In cases where a metallic cover is used, this will be advantageous in that it will prevent the cover from serving as a means for conducting the current from one contact to the other. It is also clear from Fig. 5, that the suction tube itself functions additionally as a stop for engaging one end of one of the bayonet slots to limit the rotation of the cover. It is also clear that the apertured ends of the contact strip and insulation strip constitutes a means whereby the circuit wires may be conveniently connected therewith by small bolts, or their equivalents.

In practice the device is preferably mounted upon the dash board of the automobile and secured in place by passing suitable fasteners through the attaching flanges 3. The conduit 5 is constructed in a manner to permit the same to be connected to the intake manifold of the engine. The purpose of this conduit is for creating a suction in the chamber formed between the diaphragm 6 and the wall of the concavity 4. Obviously, the suction created will serve to flex or suck the diaphragm into the concavity.

Inasmuch as this diaphragm is connected to the movable circuit closing strips 11, it is clear that when the free end of the same contacts with the stationary contact strip, the circuit, in which the device is then included, will be automatically closed.

From the foregoing it will be obvious that should the operator leave the machine and inadvertently fail to turn off the main control switch for the ignition circuit, the presence of the proposed contrivance just described in this circuit will serve to open the circuit the moment that the suction in the intake manifold stops. With the key of the main switched on, however, the moment that the operator places his foot on the starter or turns the main shaft over with the hand crank, the suction thus created by the pistons operating in the cylinders will serve, through the medium of the suction tube or switch device, to automatically close the circuit and to permit it to operate in the usual way. Consequently, the utility of a device of this kind cannot be over-estimated. Nor is the reliability and operativeness of a device of this kind to be questioned. It has been actually made and used in a number of instances and has proved beyond expectation in that it is indeed practical and efficient in every respect.

The device is exceedingly inexpensive, being made from very cheap parts which are such as to enable them to be assembled with the least possible trouble and without requiring undue time. These and other advantages and features of the invention will doubtless be made apparent by a careful reading of the description in connection with the drawings. Therefore a more lengthy description is not thought necessary.

While the preferred embodiment of the invention has been shown and described, it is to be understood that minor changes coming within the field of invention claimed may be resorted to if desired.

Having thus described my invention, what I claim as new is:—

As a new article of manufacture, an automatically operable electric circuit cut-out of the class described, a flanged cup, the bottom of said cup being centrally depressed to provide a concavity, a flexible diaphragm connected to said cup bottom and spanning the open side of the concavity to form a suction chamber, diametrically opposite contacts including relatively stationary and rigid co-acting parts, fastenings passing through said contacts and diaphragm and into the bottom of the cup for mounting said contacts on said cup, a connection between the intermediate portion of one of the contacts and the central portion of the diaphragm, a suction tube connected with the depression and communicating with said suction chamber, and a cover adapted to fit upon said cup to enclose said contacts, said cover being provided with diametrically opposite bayonet slots cooperable with the contacts and with said suction tube for maintaining the cover in place.

In testimony whereof I affix my signature.

CHARLES M. STARR.